(12) United States Patent
Lindqvist et al.

(10) Patent No.: US 7,945,369 B2
(45) Date of Patent: May 17, 2011

(54) ADAPTIVE CRUISE CONTROL SYSTEM

(75) Inventors: Kristian Lindqvist, Solna (SE);
Magnus Eriksson, Södertälje (SE)

(73) Assignee: Scania CV AB (publ) (SE)

( * ) Notice: Subject to any disclaimer, the term of this patent is extended or adjusted under 35 U.S.C. 154(b) by 344 days.

(21) Appl. No.: 12/096,816

(22) PCT Filed: Dec. 6, 2006

(86) PCT No.: PCT/SE2006/050548
§ 371 (c)(1),
(2), (4) Date: Oct. 10, 2008

(87) PCT Pub. No.: WO2007/069997
PCT Pub. Date: Jun. 21, 2007

(65) Prior Publication Data
US 2009/0125203 A1 May 14, 2009

(30) Foreign Application Priority Data
Dec. 13, 2005 (SE) ..................................... 0502820

(51) Int. Cl.
*B60K 31/00* (2006.01)
(52) U.S. Cl. .......................................... 701/96; 701/93
(58) Field of Classification Search .................. 701/93, 701/96, 36, 300, 301; 342/70, 455; 180/281, 180/282, 170, 178, 179, 177
See application file for complete search history.

(56) References Cited

U.S. PATENT DOCUMENTS

| | | | |
|---|---|---|---|
| 5,629,851 A | 5/1997 | Williams et al. | |
| 6,212,465 B1 | 4/2001 | Sielagoski et al. | |
| 7,788,012 B2 * | 8/2010 | Etori et al. | ...................... 701/96 |
| 2002/0021229 A1 | 2/2002 | Stein | |
| 2002/0138193 A1 | 9/2002 | Miyahara | |
| 2003/0204298 A1 | 10/2003 | Ahmed-Zaid et al. | |
| 2008/0051990 A1 | 2/2008 | Nomura et al. | |

FOREIGN PATENT DOCUMENTS

| | | |
|---|---|---|
| DE | 100 07 501 | 9/2001 |
| EP | 1112888 | 7/2001 |
| JP | 2005227035 | 8/2005 |

OTHER PUBLICATIONS

International Search Report dated Mar. 15, 2007 issued in corresponding PCT Application No. PCT/SE2006/050548.
Chinese Office Action dated Jul. 7, 2010 in corresponding Chinese Patent Application No. 200680046623.6 (with English language translation).

* cited by examiner

Primary Examiner — Richard M. Camby
(74) Attorney, Agent, or Firm — Ostrolenk Faber LLP

(57) ABSTRACT

An adaptive cruise control system and a method for controlling the velocity of a host motor vehicle. An object detecting device is capable of simultaneously detecting several target objects. A separate control order is generated for each detected target object for influencing engine controls and brake controls of the host vehicle to control the velocity of the host vehicle. Control orders generated for several simultaneously detected target objects are then compared and the most restrictive control order among these is selected. At least one control signal based on the selected control order is then sent to at least one of the engine controls and the brake controls of the host vehicle to control the velocity of the host vehicle in accordance with the selected control order.

8 Claims, 3 Drawing Sheets

ADAPTIVE CRUISE CONTROL SYSTEM

CROSS REFERENCE TO RELATED APPLICATION

The present application is a 35 U.S.C. §§371 national phase conversion of PCT/SE2006/050548, filed 6 Dec. 2006, which claims priority of Swedish Application No. 0502820-4, filed 13 Dec, 2005. The PCT International Application was published in the English language.

BACKGROUND OF THE INVENTION

1. Technical Field

The present invention relates to an adaptive cruise control system according to the preamble of claim 1 and a method for controlling the velocity of a motor vehicle. The invention also relates to a computer program comprising computer program code for implementing the method, a computer program product comprising a data storage medium readable by an electronic control unit and having said computer program stored thereon, and an electronic control unit.

2. Background Art

An adaptive cruise control system for use in motor vehicles is previously known, e.g. from US 2003/0204298 A1. The motor vehicle provided with the adaptive cruise control system is in the following referred to as the "host vehicle". Under driving conditions with no other vehicle within a certain range in front of the host vehicle in the predicted travelling path thereof, the adaptive cruise control system, when activated by the vehicle driver, influences the operation of the host vehicle so as to keep the velocity of the host vehicle essentially equal to a desired vehicle velocity set by the driver, in the following referred to as the "set vehicle velocity". Under said driving conditions, the adaptive cruise control system operates in a conventional cruise control mode. When an obstructing object, such as another motor vehicle, travelling in the predicted path of the host vehicle at a velocity lower than the set vehicle velocity of the host vehicle is detected within the above-indicated range, the adaptive cruise control system reduces the velocity of the host vehicle and makes the host vehicle follow the detected object at a desired distance from it, i.e. the adaptive cruise control system will in this case influence the operation of the host vehicle so as to keep the host vehicle at a desired distance from the detected object. A detected object travelling in the predicted path of the host vehicle is in the following referred to as "target object" and said desired distance is in the following referred to as the "set distance". When the obstructing target object is accelerated to a velocity above the set vehicle velocity of the host vehicle or when it for any reason no longer is detectable in the predicted travelling path of the host vehicle and no other obstructing target object is detected, the adaptive cruise control system resumes the cruise control mode and accelerates the host vehicle back to the set vehicle velocity.

When a host vehicle under the control of an adaptive cruise control system is following a first vehicle at the set distance from it and is overtaken by a second vehicle that turns in between the host vehicle and the first vehicle and keeps a velocity higher than the set vehicle velocity of the host vehicle, the adaptive cruise control system will initiate an acceleration of the host vehicle so as to accelerate it back to the set vehicle velocity. In this situation the driver of the second vehicle has two main options: either overtake also the first vehicle, or stay behind the first vehicle and thus reduce the velocity of the second vehicle to the velocity of the first vehicle. If the first option is chosen, the accelerated or accelerating host vehicle might get undesirably close to the first vehicle when the first vehicle is overtaken by the second vehicle and it might be necessary for the driver of the host vehicle to manually activate the brakes of the host vehicle, which will deactivate the adaptive cruise control system. If the second option is chosen, the accelerated or accelerating host vehicle might get undesirably close to the retarding second vehicle and it might also in this case be necessary for the driver of the host vehicle to manually activate the brakes of the host vehicle, which will deactivate the adaptive cruise control system. There is also a risk of a dangerous accident in a situation of this type due to the undesired acceleration of the host vehicle.

SUMMARY OF THE INVENTION

The object of the present invention is to propose a solution to the above-indicated problem of undesired acceleration of a motor vehicle provided with an adaptive cruise control system.

This object is achieved by means of an adaptive cruise control system according to the invention.

The adaptive cruise control system according to the invention comprises object detecting means for detecting one or several objects travelling in the predicted path of the host vehicle, here denominated target objects, and for establishing a distance value representing the prevailing distance between the host vehicle and a detected target object and a target velocity value representing the prevailing velocity of the target object or the prevailing relative velocity of the target object in relation to the host vehicle. The object detecting means is capable of simultaneously detecting several target objects and is adapted to establish a distance value and a target velocity value for each individual target object among several simultaneously detected target objects. The system further comprises processing means for repeatedly generating for each detected target object, based on information as to a set vehicle velocity, information as to the prevailing velocity of the host vehicle and information from the object detecting means as to the distance value and target velocity value for the target object, a separate control order for influencing engine control means and brake control means of the host vehicle to keep the velocity of the host vehicle essentially equal to the set vehicle velocity if the velocity of the target object is higher than the set vehicle velocity and keep the host vehicle at a set distance from the target object if the velocity of the target object is lower than the set vehicle velocity. The processing means is adapted to compare the control orders generated for several simultaneously detected target objects and to select the control order among these that is estimated to give the slowest velocity of the host vehicle. The adaptive cruise control system is then adapted to send a control signal to at least one of the engine control means and the brake control means of the host vehicle based on the selected control order so as to thereby control the velocity of the host vehicle in accordance with the selected control order.

With the inventive solution, the most restrictive control order is given the highest priority when control orders for several simultaneously detected target objects are generated. It will hereby be possible to adapt the velocity of the host vehicle in dependence on the velocity of a target object located in front of another target object and not directly in front of the host vehicle. Thus, in a situation of the above-indicated type with a target object in the form of a second vehicle overtaking a target object in the form of a first vehicle, the adaptive cruise control system according to the invention could continue to adapt the velocity of the host vehicle in dependence on the velocity of the first vehicle and thereby avoid an undesired and possibly dangerous acceleration of the host vehicle caused by the faster second vehicle.

The invention also relates to a computer program, a computer program product and an electronic control unit having the features of the invention.

BRIEF DESCRIPTION OF THE DRAWINGS

The invention will in the following be more closely described by means of embodiment examples, with reference to the appended drawings, where.

MODE(S) FOR CARRYING OUT THE INVENTION

Figure 1:
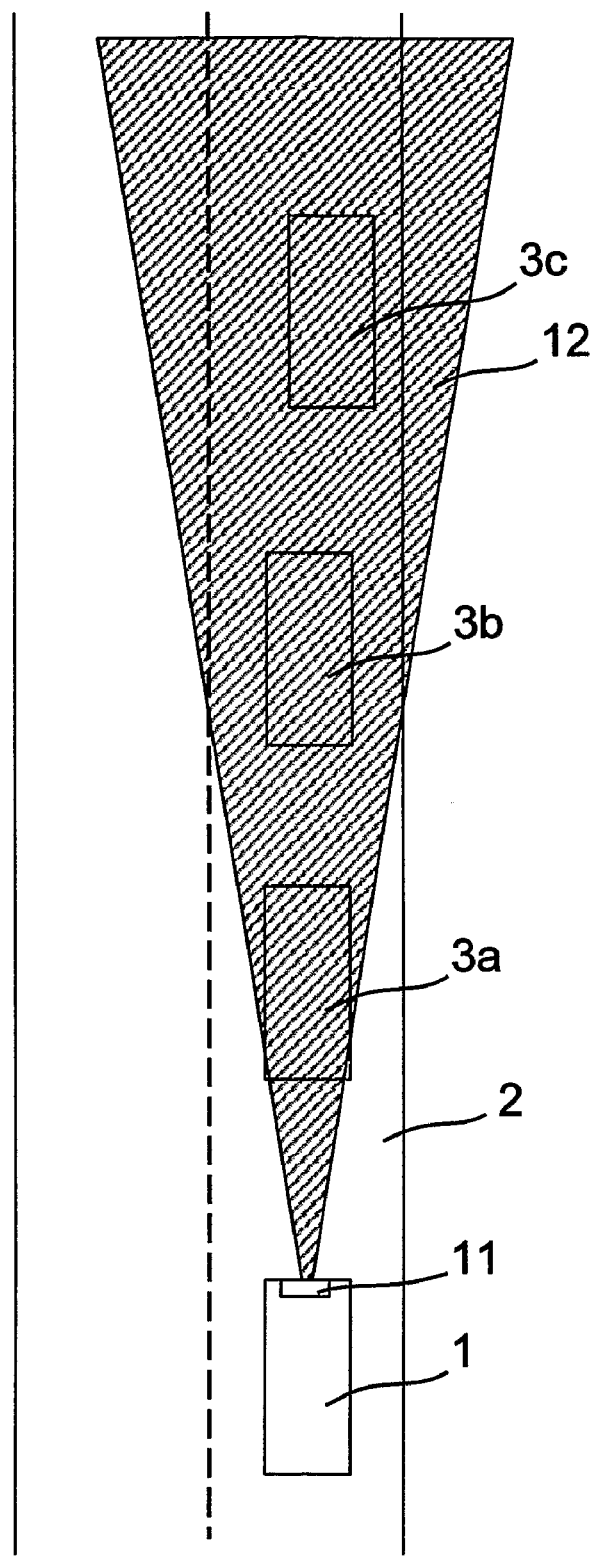
FIG. 1 is schematical planar view of a host vehicle travelling behind three target objects.

The adaptive cruise control system according to the present invention is to be used in a motor vehicle 1, here denominated host vehicle, for controlling the velocity thereof. FIG. 1 illustrates a host vehicle 1 travelling on a road 2 with three motor vehicles 3a-3c travelling in front of the host vehicle 1 in the predicted path thereof. The host vehicle 1 is for instance a car, a lorry, a towing vehicle or a bus.

Figure 2:
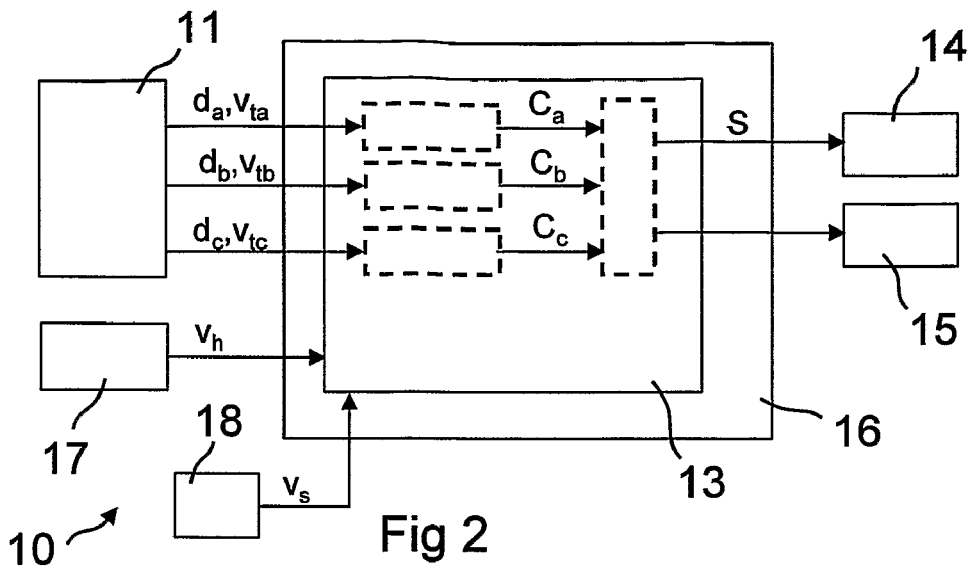
FIG. 2 is a schematical outline diagram illustrating an adaptive cruise control system according to a first embodiment of the present invention.

An adaptive cruise control system 10 according to a first embodiment of the present invention is illustrated very schematically in FIG. 2. This system comprises object detecting means 11 for detecting an object travelling in the predicted path of the host vehicle 1, here denominated target object 3a-3c, and for establishing a distance value d representing the prevailing distance between the host vehicle 1 and a detected target object and a target velocity value $v_t$ representing the prevailing velocity of the target object or the prevailing relative velocity of the target object in relation to the host vehicle. The field of view 12 covered by the object detecting means 11 is illustrated by the dashed area in FIG. 1. The object detecting means 11 is capable of simultaneously detecting several target objects within its field of view 12 and is adapted to establish a distance value d and a target velocity value $v_t$ for each individual target object among several simultaneously detected target objects. In the situation illustrated in FIG. 1, three target objects 3a-3c in the form of motor vehicles are located within the field of view 12 of the object detecting means 11 and are simultaneously detected by the object detecting means 11. Thus, the object detecting means 11 will establish a separate distance value d and a separate target velocity value $v_t$ for each one of these target objects 3a-3c.

The object detecting means 11 may be of any type that is suitable for use in an adaptive cruise control system and that is capable of simultaneously detecting several target objects located behind each other. Thus, conventional object detecting means of the type used or suggested for use in prior art adaptive cruise control systems may be used as long as these are capable of simultaneously detecting several target objects. The main requirement of the object detecting means 11 is that it shall be able to give measuring values allowing a distance value d and a target velocity value $v_t$ to be established for each detected target object. Object detecting means capable of simultaneously detecting several target objects is for instance disclosed in U.S. Pat. No. 6,606,052 B1. The object detecting means 11 may comprise one or several sensors that directly measure the distance between the host vehicle and a target object and the relative velocity of a target object in relation to the host vehicle or may be provided with processing means, e.g. in the form of one or several central processing units (CPU:s), for establishing said distance value d and said target velocity value $v_t$ based on measuring signals from one or several sensors included in the object detecting means. The object detecting means 11 may for instance comprise one or several radar units or one or several lidar units or one or several camera units.

The system 10 further comprises processing means 13 for repeatedly generating for each detected target object 3a-3c, based on information as to a set vehicle velocity $v_s$ for the host vehicle, information as to the prevailing velocity $v_h$ of the host vehicle and information from the object detecting means 11 as to the distance value d and target velocity value $v_t$ for the target object, a separate control order $C_a$-$C_c$ for influencing engine control means 14 and brake control means 15 of the host vehicle 1 to keep the velocity of the host vehicle essentially equal to the set vehicle velocity $v_s$ if the velocity of the target object is higher than the set vehicle velocity $v_s$ and keep the host vehicle 1 at a set distance $d_s$ from the target object if the velocity of the target object is lower than the set vehicle velocity $v_s$.

Said engine control means 14 may be an engine control unit of the host vehicle and said brake control means 15 may be a brake control unit of the host vehicle.

The processing means 13 may e.g. be constituted by a central processing unit (CPU) of an electronic control unit 16 of the host vehicle 1. The processing means 13 may also comprise two or more central processing units. Information as to the prevailing velocity $v_h$ of the host vehicle 1 may be supplied to the processing means 13 directly from a velocity sensor arranged to sense the vehicle velocity or from a control unit 17 connected to such a velocity sensor. The desired vehicle velocity $v_s$, here denominated set vehicle velocity, is set by the driver of the host vehicle 1 by means of velocity setting means 18. The velocity setting means 18 may for instance comprise a set member, such as a depressible switch or button, to be actuated by the driver when the host vehicle is running at a velocity which the driver wants to maintain. By actuation of the set member, the prevailing velocity of the host vehicle is entered as the value of the set vehicle velocity and the adaptive cruise control system is activated. The set distance $d_s$ is a given distance to be maintained between the host vehicle 1 and a detected target object. The set distance $d_s$ may be fixed or may be adjustable. The set distance $d_s$ may be adjustable either automatically, for example through means of the electronic control unit 16 executing pre-stored instructions for a set distance varying depending on prevailing traffic conditions as sensed through the described object detecting means 11 or it may be adjusted manually, for example by the host vehicle driver operating a distance setting means (not shown). For a manual adjustment, the distance setting means may for instance comprise a set member, such as a depressible switch or button, to be actuated by the host vehicle driver when the host vehicle is running at a distance from a target vehicle which the driver wants to maintain. Alternatively, the distance setting means comprises a display on which a distance level may be displayed and set manually by the driver via manipulating a switch or lever. The display then for example may show a distance level scale from 1 to 5, where each step on the scale may represent a certain distance in meters or as a time interval in seconds to be maintained to the target vehicle. The control orders $C_a$-$C_c$ are established by the processing means 13 in a conventional manner known by persons skilled in the art.

The processing means 13 is adapted to compare the control orders $C_a$-$C_c$ generated for several simultaneously detected target objects 3a-3c and to select the control order among these that is estimated to give the slowest velocity of the host vehicle, i.e. the most restrictive control order. If the generated control orders $C_a$-$C_c$ comprise more than one control order implying a retardation of the host vehicle, the control order implying the highest retardation is selected. If the control orders $C_a$-$C_c$ comprise only one control order implying a retardation of the host vehicle, this control order is selected. If the control orders $C_a$-$C_c$ only comprise control orders implying an acceleration of the host vehicle, the control order implying the lowest acceleration is selected. The adaptive cruise control system 10 is adapted to send a control signal S to the engine control means 14 and the brake control means 15 of the host vehicle based on the selected control order so as to thereby control the velocity of the host vehicle 1 in accordance with the selected control order. Thus, the velocity of the host vehicle 1 is controlled in accordance with the most restrictive control order when several target objects are simultaneously detected within the field of view 12 of the object detecting means 11. When no target object is detected within the field of view 12 of the object detecting means 11, the adaptive cruise control system 10, if activated by the driver, operates in a conventional cruise control mode so as to keep the velocity of the host vehicle 1 essentially equal to the set vehicle velocity $v_s$ by generating suitable control orders and corresponding control signals based on a comparison between the prevailing velocity $v_h$ of the host vehicle and the set vehicle velocity $v_s$.

In the situation illustrated in FIG. 1 with three simultaneously detected target objects 3a-3c, the object detecting means 11 will establish a first distance value $d_a$ and a first target velocity value $v_{ta}$ for the first target object 3a, a second distance value $d_b$ and a second target velocity value $v_{tb}$ for the second target object 3b, and a third distance value $d_c$ and a third target velocity value $v_{tc}$ for the third target object 3c, as illustrated in FIG. 2. The processing means 13 will in this case generate a first control order $C_a$ based on the first distance value $d_a$ and the first target velocity value $v_{ta}$, a second control order $C_b$ based on the second distance value $d_b$ and the second target velocity value $v_{tb}$, and a third control order $C_c$ based on the third distance value $d_c$ and the third target velocity value $v_{tc}$. The processing means 13 will then compare these three control orders $C_a$, $C_b$, $C_c$ and select the most restrictive one. Thereafter, a control signal S for at least one of the engine control means 14 and the brake control means 15 will be established based on the selected control order. The selected control order may be sent as one or more such signals S. In certain cases two control signals S are established or generated based on the selected control order and sent one to the engine control means 14 and the other to the brake control means 15. If for example a retardation or braking of the vehicle is required to maintain a set distance to a target vehicle the control order may constitute both a brake control signal to the brake control means 15 for applying a certain brake force and an engine control signal to the engine control means 14 for a certain simultaneous engine control, for example motor-braking, so as to achieve an optimum vehicle retardation, i.e. to achieve the desired or demanded retardation as quickly as possible or alternatively in a way that optimizes the service life-length of the operating vehicle components. Alternatively only one of an engine control signal and a brake control signal is established based on the selected control order and sent to the concerned control means for achieving the demanded effect, i.e. a vehicle velocity increase or decrease.

In the embodiment illustrated in FIG. 2, the respective control order $C_a$-$C_c$ is generated by the processing means 13 so as to be directly treatable by the engine control means 14 or the brake control means 15, i.e. generated in a form adapted to the interface of the engine control means or the brake control means. Thus, the control signal S is in this case identical with the most restrictive one of the generated control orders $C_a$-$C_c$.

Figure 3:
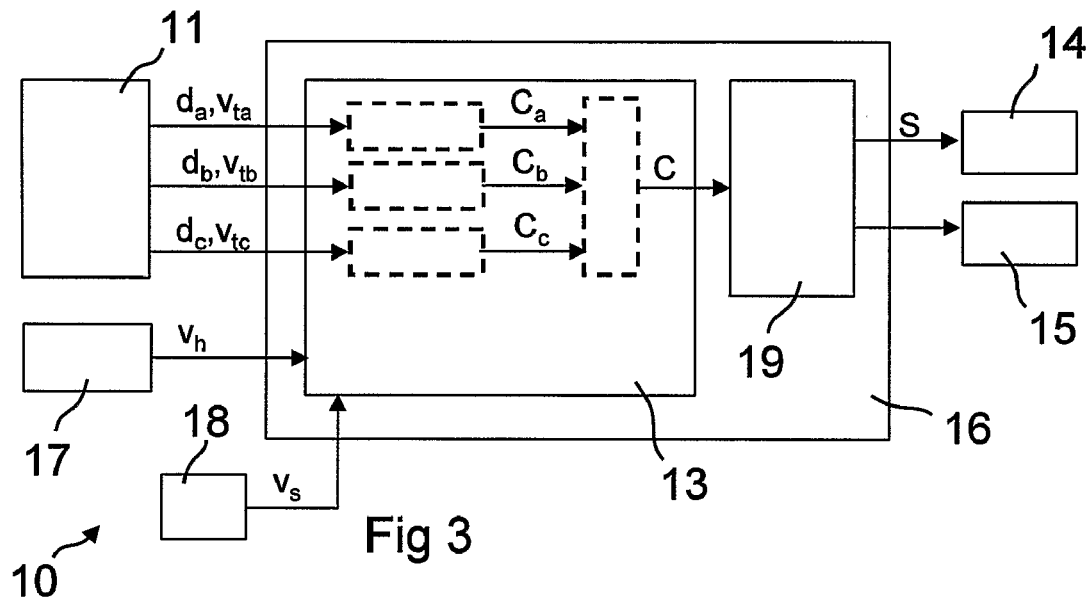
FIG. 3 is a schematical outline diagram illustrating an adaptive cruise control system according to a second embodiment of the present invention.

In the embodiment illustrated in FIG. 3, the respective control order $C_a$-$C_c$ generated by the processing means 13 represents a value of at least one of a desired acceleration and retardation of the host vehicle. In this case, the adaptive cruise control system 10 comprises signal generating means 19 for converting the selected control order into at least one corresponding control signal S of a form adapted to the interface of the engine control means 14 and/or the brake control means 15. As to the rest, the embodiment illustrated in FIG. 3 corresponds to the embodiment illustrated in FIG. 2.

Figure 5:
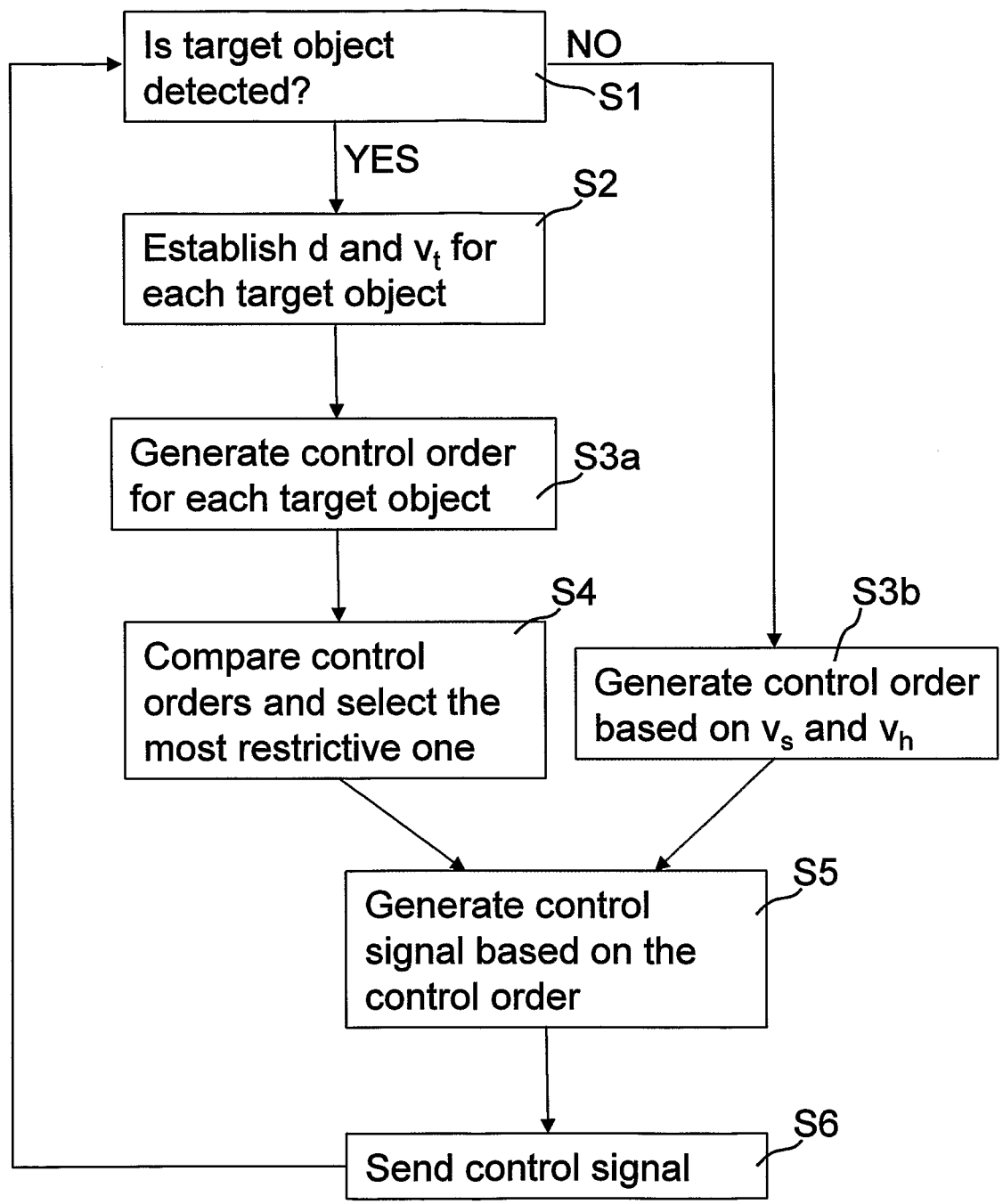
FIG. 5 is a flow diagram illustrating a method according to an embodiment of the invention.

A flow diagram illustrating a method according to an embodiment of the invention is shown in FIG. 5. In a first step S1, it is controlled whether or not a target object is detected within a field of view 12 of an object detecting means 11 mounted to the host vehicle 1. If one or several target objects 3a-3c are detected, a distance value d and a target velocity value $v_t$ are established for each target object in a second step S2. A separate control order is then generated for the respective target object in a third step S3a by calculations based on information as to the set vehicle velocity $v_s$, information as to the prevailing velocity $v_h$ of the host vehicle and information as to the distance value d and the target velocity value $v_t$ for the target object. Thereafter, in a fourth step S4, control orders generated for several simultaneously detected target objects are compared and the most restrictive control order among these control orders is selected, i.e. the control order that is estimated to result in the slowest velocity of the host vehicle is selected. A control signal of a type adapted to the interface of the engine control means 14 or the brake control means 15 of the host vehicle is then generated based on the selected control order in a subsequent step S5. If no target object is detected in step S1, a control order is generated in step S3b based on information as to the set vehicle velocity $v_s$ and information as to the prevailing velocity $v_h$ of the host vehicle, whereupon a control signal of a type adapted to the interface of the engine control means 14 or the brake control means 15 of the host vehicle is generated based on this control order in the subsequent step S5. Alternatively, as mentioned above, two control signals are generated in step S5, one adapted to the engine control means 14 interface and the other adapted to the brake control means 15 interface. In a last step S6, the control signal(s) generated in step S5 is/are sent to the engine control means 14 and/or the brake control means 15 of the host vehicle. The steps S1-S6 are repeatedly carried out as long as the adaptive cruise control system is in operation. The operation of the adaptive cruise control system 10 may be interrupted in a conventional manner, e.g. by the actuation of a throttle lever or a brake lever by the driver of the host vehicle.

Computer program code for implementing a method according to the invention is suitably included in a computer program, which is loadable directly into the internal memory of a computer, such as the internal memory of an electronic control unit of the host vehicle. Such a computer program is suitably provided via a computer program product comprising a data storage medium readable by an electronic control unit, which data storage medium has the computer program stored thereon. Said data storage medium is for instance an optical data storage medium in the form of a CD-ROM disc, a DVD disc etc, a magnetic data storage medium in the form of a hard disc, a diskette, a cassette tape etc, or a memory of the type ROM, PROM, EPROM or EEPROM or a Flash memory.

The computer program according to the invention comprises computer program code for causing a computer of a motor vehicle 1, here denominated host vehicle:

to determine or receive a first velocity value $v_h$ representing the prevailing velocity of the host vehicle 1;

to receive a second velocity value $v_s$ representing a set vehicle velocity for the host vehicle 1;

to determine or receive, for each one of one or several detected objects 3a-3c travelling in the predicted path of the host vehicle, here denominated target objects, a distance value d representing the distance between the host vehicle and the target object and a target velocity value $v_t$ representing the velocity of the target object or the relative velocity of the target object in relation to the host vehicle;

to generate for each detected target object 3a-3c, based on the distance value d and the target velocity value $v_t$ for the target object, the first velocity value $v_h$ and the second velocity value $v_s$, a separate control order for influencing engine control means and brake control means of the host vehicle to keep the velocity of the host vehicle essentially equal to the set vehicle velocity $v_s$ if the velocity of the target object is higher than the set vehicle velocity $v_s$ and keep the host vehicle at a set distance $d_s$ from the target object if the velocity of the target object is lower than the set vehicle velocity $v_s$;

to compare the control orders generated for several simultaneously detected target objects and select the control order among these that is estimated to give the slowest velocity of the host vehicle, and to send a control signal to at least one of the engine control means and the brake control means of the host vehicle based on the selected control order so as to thereby control the velocity of the host vehicle in accordance with the selected control order.

Figure 4:
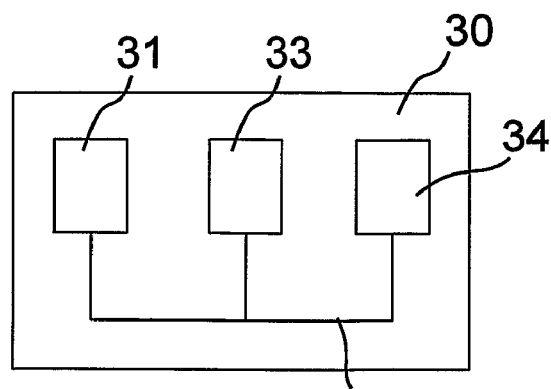
FIG. 4 is a schematical outline diagram of an electronic control unit for implementing a method according to the invention.

FIG. 4 very schematically illustrates an electronic control unit 30 comprising an execution means 31, such as a central processing unit (CPU), for executing computer software. The execution means 31 communicates with a memory 33, for instance of the type RAM, via a data bus 32. The control unit 30 also comprises data storage medium 34, for instance in the form of a memory of the type ROM, PROM, EPROM or EEPROM or a Flash memory. The execution means 31 communicates with the data storage medium 34 via the data bus 32. A computer program comprising computer program code for implementing a method according to the invention is stored on the data storage medium 34.

The invention is of course not in any way restricted to the embodiments described above. On the contrary, many possibilities to modifications thereof will be apparent to a person with ordinary skill in the art without departing from the basic idea of the invention as defined in the appended claims.

The invention claimed is:

1. An adaptive cruise control system for use in a host motor vehicle, said adaptive cruise control system comprising:

object detecting apparatus operable for detecting a target object travelling in a predicted path of the host vehicle and for establishing a distance value (d) representing the prevailing distance between the host vehicle and a detected target object and a target velocity value ($v_t$) representing the prevailing velocity of the target object or the prevailing relative velocity of the target object in relation to the host vehicle; and a processor which uses information as to a set vehicle velocity ($v_s$), information as to the prevailing velocity ($v_h$) of the host vehicle and information from the object detecting apparatus as to the distance value (d) and target velocity value ($v_t$) for a detected target object, for repeatedly generating a control order for influencing engine control apparatus and brake control apparatus of the host vehicle to keep the velocity of the host vehicle essentially equal to the set vehicle velocity ($v_s$) when no target object having a velocity lower than the set vehicle velocity ($v_s$) is detected and, to keep the host vehicle at a set distance ($d_s$) from the target object, when a target object having a velocity lower than the set vehicle velocity ($v_s$) is detected, the object detecting apparatus is operable to simultaneously detect several target objects and is operable to establish a distance value (d) and a target velocity value ($v_t$) for each individual target object among several simultaneously detected target objects;

the processor is operable to generate a separate control order for each individual target object among several simultaneously detected target objects;

the processor is also operable to compare the control orders generated for several simultaneously detected target objects and to select the control order among these that is estimated to give the slowest velocity of the host vehicle, and the adaptive cruise control system is operable to send a control signal to at least one of the engine control apparatus and the brake control apparatus of the host vehicle based on the selected control order so as to thereby control the velocity of the host vehicle in accordance with the selected control order.

2. An adaptive cruise control system according to claim 1, wherein the processor is operable so that the respective control order generated by the processor represents a value of a desired acceleration or retardation of the host vehicle, and the adaptive cruise control system comprises a signal generator for converting the selected control order into at least one control signal.

3. An adaptive cruise control system according to claim 2, wherein the respective control order generated by the processor directly controls the engine control apparatus or the brake control apparatus said control signal corresponding to the selected control order.

4. An adaptive cruise control system according to claim 1, wherein the object detecting apparatus comprises a radar unit, a lidar unit or a camera unit operable for establishing a distance value (d) and a target velocity value ($v_t$) for one or several detected target objects.

5. A method for controlling the velocity of a host motor vehicle, the method comprising the steps of:

detecting one or several target objects travelling in a predicted path of the host vehicle and establishing for each individual target object among several simultaneously detected target objects a distance value (d) representing a prevailing distance between the host vehicle and the target object and a target velocity value ($v_t$) representing a prevailing velocity of the target object or a prevailing relative velocity of the target object in relation to the host vehicle;

based on information as to a set vehicle velocity ($v_s$), information as to the prevailing velocity ($v_h$) of the host vehicle and information as to the distance value (d) and the target velocity value ($v_t$) for the target object generating for each detected target object, a separate control order for influencing engine control apparatus and brake control apparatus of the host vehicle to keep the velocity of the host vehicle essentially equal to the set vehicle velocity ($v_s$) if the velocity of the target object is higher than the set vehicle velocity ($v_s$) and keep the host vehicle at a set distance ($d_s$) from the target object if the velocity of the target object is lower than the set vehicle velocity ($v_s$);

comparing the control orders generated for several simultaneously detected target objects and selecting the control order that is estimated to give the slowest velocity of the host vehicle; and based on the selected control order, sending a control signal to at least one of the engine control apparatus and the brake control apparatus of the host vehicle to control the velocity of the host vehicle in accordance with the selected control order.

6. A computer program on a computer readable medium and loadable into an internal memory of a computer of a host motor vehicle, which computer program comprises computer program code on the medium for causing the computer:

to determine or receive a first velocity value ($v_h$) representing a prevailing velocity of the host vehicle;

to receive a second velocity value ($v_s$) representing a set vehicle velocity;

for each one of one or several detected target objects travelling in the predicted path of the host vehicle, to determine or receive a distance value (d) representing the prevailing distance between the host vehicle and the target object and a target velocity value ($v_t$) representing the prevailing velocity of the target object or the prevailing relative velocity of the target object in relation to the host vehicle;

based on the distance value (d) and the target velocity value ($v_t$) for the target object, the first velocity value ($v_h$) and the second velocity value ($v_s$), to generate for each detected target object, a separate control order for influencing engine control apparatus and brake control apparatus of the host vehicle to keep the velocity of the host vehicle essentially equal to the set vehicle velocity ($v_s$) if the velocity of the target object is higher than the set vehicle velocity ($v_s$) and keep the host vehicle at a set distance ($d_s$) from the target object if the velocity of the target object is lower than the set vehicle velocity ($v_s$);

to compare the control orders generated for several simultaneously detected target objects and select the control order that is estimated to give the slowest velocity of the host vehicle, and to send a control signal to at least one of the engine control apparatus and the brake control apparatus of the host vehicle based on the selected control order so to control the velocity of the host vehicle in accordance with the selected control order.

7. A computer program product comprising a computer readable medium readable by an electronic control unit, and a computer program according to claim 6 being stored on said data storage medium.

8. An electronic control unit comprising an execution apparatus a memory connected to the execution apparatus and a data storage medium connected to the execution apparatus, and a computer program according to claim 6 being stored on said data storage medium.

\* \* \* \* \*